(No Model.)
N. F. YORKE.
SEED PLANTER AND FERTILIZER DISTRIBUTER.
No. 441,386. Patented Nov. 25, 1890.
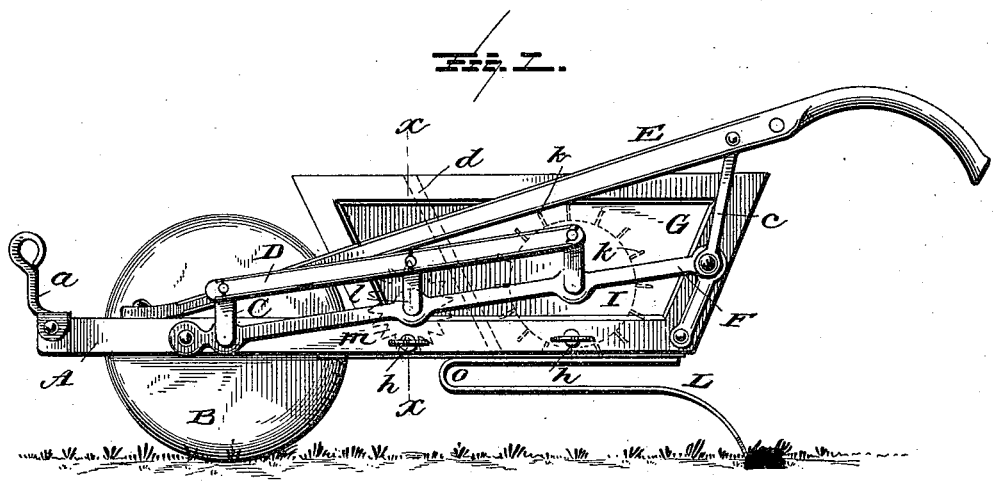
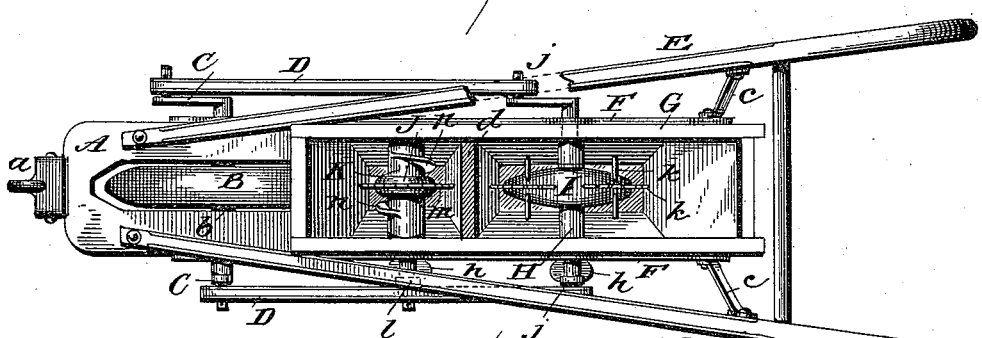
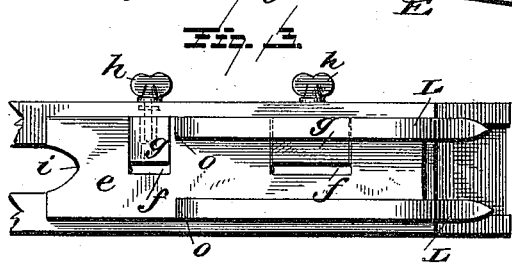
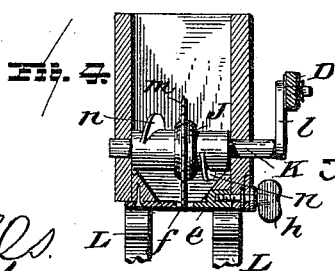
Witnesses
L. C. Mills.
Wm. C. Grant
Inventor
Nathan F. Yorke,
per Chas. H. Fowler
Attorney

UNITED STATES PATENT OFFICE.

NATHAN F. YORKE, OF CONCORD, NORTH CAROLINA.

SEED-PLANTER AND FERTILIZER-DISTRIBUTER.

SPECIFICATION forming part of Letters Patent No. 441,386, dated November 25, 1890.

Application filed August 19, 1890. Serial No. 362,388. (No model.)

*To all whom it may concern:*

Be it known that I, NATHAN F. YORKE, a citizen of the United States, residing at Concord, in the county of Cabarrus and State of North Carolina, have invented certain new and useful Improvements in Seed-Planters and Fertilizer-Distributers; and I do hereby declare that the following is a full, clear, and exact description of the same, reference being had to the annexed drawings, making a part of this specification, and to the letters of reference marked thereon.

This invention relates to certain new and useful improvements in cotton-seed planters and fertilizer-distributers; and it has for its object to provide a simple, cheap, durable, and efficient device embodying these two features.

The novelty resides in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a side elevation of my improved machine. Fig. 2 is a top plan of the same with one of the handles broken away and the partition between the hoppers in section. Fig. 3 is a bottom view of the hoppers. Fig. 4 is a vertical cross-section through the line $x$ $x$ of Fig. 1.

Like letters of reference indicate like parts throughout the several views.

Referring now to the details of the drawings by letter, A designates the frame of the machine, to the forward end of which is attached a suitable clevis $a$.

B is the wheel carried by a suitable shaft or axle $b$, journaled in bearings on the front end of the frame, the wheel being arranged between the forks of the front end of the frame, as seen in Fig. 2. Upon each end of the axle or shaft $b$ is a crank-arm C, said arms being arranged at right angles to each other, and to each shaft is pivotally connected a bar or rod D, designed to connect with the crank-arms on the shafts of the wheels in the seed and fertilizer hoppers.

E are the handles, secured at their front ends to the sides of the frame, and at or near their rear ends braced by the arms $c$, which extend from the metal bars F on each side of the hoppers, as seen in Figs. 1 and 2.

G is the hopper, divided by the inclined partition $d$ into two compartments or hoppers, one larger than the other, as shown. The smaller one, which is next behind the wheel, is designed to contain fertilizer and the rear and larger one the seed. The bottom of the hoppers is formed by a metallic plate $e$, provided with openings $f$, the size of which is governed by the plates $g$, which are adjusted in or out by the screws $h$. (See Figs. 1, 3, and 4.) The forward end of this plate is provided with a notch $i$, which embraces the wheel and serves as a scraper therefor, as will be readily understood from Fig. 3.

H is a shaft, journaled in the side walls of the rear hopper and having its ends projecting beyond the outside of the said walls, and upon these extended ends are the crank-arms $j$, which are pivotally connected with the bars or rods D. On this shaft within the seed-hopper is a wheel I, having pins or projections $k$, extending both in line with and at right angles to the axis of the wheel and serving to agitate the seed in the usual manner.

Within the forward hopper is a wheel J, carried by the shaft K, one end of which extends beyond the side walls of the hopper and is provided with a crank-arm $l$, which is pivotally connected with the bar or rod D. The crank-arms on the opposite ends of these shafts are arranged at right angles to each other, like the crank-arms on the axle or shaft $b$. This wheel J is provided with radial projections or pins $m$ to agitate the fertilizer within the hopper, and upon each side of this wheel the shaft is provided with a spiral or screw-shaped wing or flange $n$, as seen in Figs. 2 and 4, and which serve to guide the fertilizer toward the wheel, where the projections or teeth thereon may act upon it. The pins or projections on the wheels within the hoppers work through the slots or openings in the bottoms of the hoppers, as shown.

The metal bars F extend in an inclined direction along the sides of the hoppers, and at their forward ends are secured to the side bars of the frame, as seen in Fig. 1. They serve as bearings for the shafts and axle and greatly strengthen the parts.

The covers L are each formed of a single piece of metal, bent into the form shown, with one portion secured to the under side of the frame of the machine, being provided with a bend o about midway of the length of the machine, with the rear ends curved downward, as seen in Fig. 1. This gives sufficient resiliency to the covers for all practicable purposes.

The operation of the device will be readily understood from the above description when taken in connection with the drawings, and a detailed description thereof is not deemed necessary.

The spiral flanges n are arranged to move with the wheel J, and may be arranged on the hub thereof or on a sleeve on the shaft by which the wheel is carried. Either construction serves the purpose.

What I claim as new is—

1. The combination, with the frame, the wheel, and the hoppers, of the shafts passed through the hoppers and provided with crank-arms, the bars F, extending in an inclined direction along the sides of the hopper, the crank-arms on the axle, and the rods D, pivotally connected with said crank-arms and arranged parallel with the bars F, substantially as and for the purpose specified.

2. The combination, with the frame and the metal bars F, secured along opposite sides thereof, of the handles, the bars extending from the metal bars and connected to the handles, and the shafts extended through the walls of the hoppers and having bearings in the metal bars, and the bars D, connecting the ends of the shafts, substantially as specified.

In testimony that I claim the above I have hereunto subscribed my name in the presence of two witnesses.

NATHAN F. YORKE.

Witnesses:
C. A. DAY,
JNO. WADSWORTH.